US008560840B2

(12) United States Patent
Williams et al.

(10) Patent No.: US 8,560,840 B2
(45) Date of Patent: Oct. 15, 2013

(54) METHOD AND SYSTEM FOR AUTHENTICATING A WIDGET

(75) Inventors: Carnet Williams, Honolulu, HI (US); Olin Lagon, Honolulu, HI (US); Kevin Hughes, Honolulu, HI (US)

(73) Assignee: InMobi Pte Ltd., Singapore (SG)

( * ) Notice: Subject to any disclaimer, the term of this patent is extended or adjusted under 35 U.S.C. 154(b) by 670 days.

(21) Appl. No.: 11/877,198

(22) Filed: Oct. 23, 2007

(65) Prior Publication Data

US 2008/0215879 A1 Sep. 4, 2008

Related U.S. Application Data

(60) Provisional application No. 60/853,829, filed on Oct. 23, 2006, provisional application No. 60/854,018, filed on Oct. 23, 2006.

(51) Int. Cl.
*H04L 9/00* (2006.01)
*H04L 9/32* (2006.01)

(52) U.S. Cl.
USPC .............. 713/159; 726/2; 715/716; 715/719; 715/733; 715/749; 705/500

(58) Field of Classification Search
USPC .............. 713/159; 726/2; 715/716, 719, 733; 715/749; 705/500
See application file for complete search history.

(56) References Cited

U.S. PATENT DOCUMENTS

| 5,963,191 | A | 10/1999 | Jaaskelainen, Jr. | |
|---|---|---|---|---|
| 6,237,004 | B1 * | 5/2001 | Dodson et al. | 1/1 |
| 6,629,135 | B1 | 9/2003 | Ross, Jr. et al. | |
| 6,871,327 | B2 | 3/2005 | Polk | |
| 7,269,792 | B2 | 9/2007 | Consolatti et al. | |
| 7,565,332 | B2 | 7/2009 | Williams | |
| 2002/0049816 | A1 | 4/2002 | Costin | |
| 2002/0069122 | A1 | 6/2002 | Yun et al. | |
| 2002/0174214 | A1 | 11/2002 | Carl et al. | |
| 2002/0184539 | A1 | 12/2002 | Fukuda et al. | |
| 2003/0078791 | A1 | 4/2003 | Tufte | |
| 2003/0196121 | A1 * | 10/2003 | Raley et al. | 713/201 |
| 2004/0019807 | A1 | 1/2004 | Freund | |
| 2004/0024720 | A1 | 2/2004 | Fairweather | |
| 2004/0044999 | A1 | 3/2004 | Gibson | |
| 2004/0083453 | A1 | 4/2004 | Knight et al. | |
| 2004/0225617 | A1 | 11/2004 | Baser et al. | |
| 2005/0049989 | A1 * | 3/2005 | Kaminsky et al. | 706/47 |
| 2005/0159974 | A1 | 7/2005 | Moss et al. | |
| 2005/0240433 | A1 | 10/2005 | Schwartz | |
| 2006/0149650 | A1 | 7/2006 | Dilley | |

(Continued)

OTHER PUBLICATIONS

PCT International Search Report and Written Opinion of the International Searching Authority, issued Jun. 10, 2008, application No. PCT/US07/82283.

(Continued)

*Primary Examiner* — Brandon Hoffman
*Assistant Examiner* — Samuel Ambaye
(74) *Attorney, Agent, or Firm* — Convergent Law Group LLP (57) ABSTRACT

A system and computer implemented method for providing a widget are described. The widget is portable, embeddable and for dynamically displaying multimedia content. The method and system include receiving a request corresponding to the widget and performing an authentication corresponding to the request. The method and system also include fulfilling the request if the authentication is successful.

24 Claims, 4 Drawing Sheets

(56) References Cited

U.S. PATENT DOCUMENTS

| | | | |
|---|---|---|---|
| 2006/0173744 | A1 | 8/2006 | Kandasamy |
| 2006/0184802 | A1 | 8/2006 | Ibrahim et al. |
| 2006/0184869 | A1 | 8/2006 | Tiffany |
| 2007/0112714 | A1 | 5/2007 | Fairweather |
| 2008/0010133 | A1 | 1/2008 | Pyhalammi |
| 2008/0034309 | A1* | 2/2008 | Louch et al. .......... 715/766 |
| 2008/0255962 | A1 | 10/2008 | Chang et al. |
| 2009/0037257 | A1 | 2/2009 | Stuckey et al. |

OTHER PUBLICATIONS

PCT International Search Report and Written Opinion of the International Searching Authority, issued Jun. 10, 2008, application No. PCT/US07/82293.

PCT International Search Report and Written Opinion of the International Searching Authority, issued Aug. 8, 2008, application No. PCT/US07/82303.

Devoney, C., "Multimedia ToolBook 1.5", Windows Sources, vol. 1, No. 5, p. 386, Jun. 1993.

Frakes, D., "Hot Widgets", Macworld, vol. 23, No. 2, p. 54, Feb. 2006.

Anon., "Startup PostApp Readies Online Widget Marketplace; PostApp's Widgetbox Would Help Developers Distribute and Handle Payments for Their Web 2.0 Applications", InternetWeek, Jun. 23, 2006.

Anon., "KickApps Instantly Adds User-Generated Video and Social Networking to Any Website Does Your Website KickApps?", PR Newswire, Jul. 12, 2006.

Anon., "Sharpcast Delivers a Breakthrough One-Step Solution for Sharing, Backing up, Accessing, and Syncing Photos Between PCs, the Web, and Mobile Phones", PR Newswire, Mar. 7, 2007.

PCT International Search Report and Written Opinion of the International Searching Authority, issued Jun. 30, 2010, application No. PCT/US2007/082297.

Non-Final Office Action dated Apr. 6, 2011 for U.S. Appl. No. 11/877,623.

www.blackbaud.com, Oct. 1, 2006. Recovered from www.archive.org.

* cited by examiner

METHOD AND SYSTEM FOR AUTHENTICATING A WIDGET

CROSS-REFERENCE TO RELATED APPLICATIONS

The present application claims priority from co-pending provisional application Ser. No. 60/853,829, filed Oct. 23, 2006, entitled "Method and System for Facilitating Social Payment or Commercial Transactions", and from co-pending provisional application Ser. No. 60/854,018, filed Oct. 23, 2006, entitled "Method and System for Facilitating Social Payment or Commercial Transactions", both assigned to the assignee of the present application.

BACKGROUND OF THE INVENTION

The World Wide Web has matured into an integral part of daily life for users around the world. The Internet may be used for commerce, social transactions, and sharing of multimedia content. For example, electronic commerce has grown significantly in recent years. Consumer commercial transactions that occur over the World Wide Web or use protocols that leverage the Internet such as SMTP (email) are collectively known as "electronic commerce." The current model for electronic commercial transactions typically involves one merchant and one consumer engaging in a one-to-one transaction in which a consumer selects a set of goods and/or services and pays for those goods and/or services through the merchant, and the merchant fulfils the order. The Internet may also be used to facilitate merchants' ability to target potential consumers for commercial transactions. A merchant may customize advertisements and provide the advertisements to selected users. In Google™ AdWords, for example, the merchants' customized content may be selectively displayed based upon search terms users provide to Google™. The content provided also provides a mechanism for users to access the merchants' site and, therefore, make purchases. Similarly, affiliate marketing allows a promoter to serve up a static text/image link to a visitor that allows for a click through to a page set by an Organizer. If the visitor takes action as set by the Organizer (visits a page, completes a form, conducts a transaction, etc.) an Affiliate Marketing firm tracks this action that takes place on the Organizer's server and completes a transaction based on the agreement between the Organizer and Promoter. After an action is taken by a Visitor, the Promoter's text/image link is in no way modified to reflect this incremental action or changes in form, function, and content based on this incremental action. Such commercial mechanisms may be considered to be one-to-many, allowing a single merchant to reach a large number of consumers.

The World Wide Web has also experienced tremendous growth as a social media. As a social media, the World Wide Web provides a vehicle for sharing user generated content, such as through blogs, personal profiles, videos, podcasts, and the like. Platforms for sharing user generated content, such as Blogger, Myspace, YouTube, and Facebook have been developed and benefited from this growth. Other mechanisms for facilitating social interactions, such as eVite, have also grown. Using eVite, for example, an organizer may set up an event, sent invitation emails to potential participants, manage RSVPs, estimate budgets, and perform other functions related to the event via dedicated pages on eVite. Moreover, social media and fundraising combine in social payments to raise money for a variety of causes. Social media may be used to provide "Blogathons" that raise money for charities, political campaigns, allow musicians to appeal directly to their audience to underwrite albums, raise money for schools, parties, clubs and sports teams, or other causes. In such social payment transactions, organizers may solicit funds from other individuals visiting blogs or sites.

In order to display media for a variety of purposes, conventional widgets may be used. The conventional widgets are often used to display content from a widget owner to a user. For example, a user may load a page, or site, containing the conventional widget and view content, such as video, provided by the conventional widget. Conventional widgets are generally embeddable, portable applications that often run without access to a user's file system. The conventional widget may be copyable by users. Thus, a user may copy a widget from a site to a location of the user's choosing, for example the user's own blog. Conventional widgets are also generally small in size and less complex than typical applications, such as email or word processing applications. However, there is typically no agreed upon limitation in size or complexity for conventional widgets. Such widgets may be used, for example, by bloggers to share Although electronic commerce and social transactions are possible via the World Wide Web, there are drawbacks. Many social and electronic commerce transactions involve many-to-many relationships. Such relationships are not well supported by current electronic commerce and social media platforms. In addition, the ability of tools, such as widgets, to reflect individual users' tastes may be limited. Consequently, users' ability to engage in social, commercial, and other transactions including sharing of multimedia content may be limited.

Accordingly, what is needed is a method and system for facilitating social and commercial transactions via the Internet. The present invention addresses such a need.

BRIEF SUMMARY OF THE INVENTION

A system and computer implemented method for providing a widget are described. The widget is portable, embeddable and for dynamically displaying multimedia content. In one aspect, the method and system include receiving a request corresponding to the widget and performing an authentication corresponding to the request. The method and system also include fulfilling the request if the authentication is successful. In another aspect, the method and system include receiving a request for the widget from a host application and providing an encrypted code to the host application. In this aspect, the method and system may include referring the host application to an additional site and providing a widget code for the widget to the host application from the additional site. In such an aspect, the method and system also include allowing the widget code to be played on the host application, receiving an additional request for a widget feed from the widget and providing the widget feed in response to the additional request if the widget can decrypt the encrypted code. In another aspect, the method and system include providing at least one server, a database, and an authentication system. In this aspect, the server(s) receive a request corresponding to the widget. The database stores data for the widget. The authentication system performs an authentication corresponding to the request. The request is fulfilled if the authentication is successful. In one embodiment, the authentication system may be part of the server. In another embodiment, the authentication system may be separate from the server.

According to the method and system disclosed herein, widget(s), server(s), widget request(s) and other features of the system may be authenticated. Consequently, a higher level of trustability may be provided.

DETAILED DESCRIPTION OF THE INVENTION

The present invention relates to a method and system for providing a widget. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

A system and computer implemented method for providing a widget are described. The widget is portable, embeddable and for dynamically displaying multimedia content. In one aspect, the method and system include receiving a request corresponding to the widget and performing an authentication corresponding to the request. The method and system also include fulfilling the request if authentication is successful. In another aspect, the method and system include receiving a request for the widget from a host application and providing an encrypted code to the host application. In this aspect, the method and system may include referring the host application to an additional site and providing a widget code for the widget to the host application from the additional site. In such an aspect, the method and system also include allowing the widget code to be played on the host application, receiving an additional request for a widget feed from the widget and providing the widget feed in response to the additional request if the widget can decrypt the encrypted code. In another aspect, the method and system include providing at least one server, a database, and an authentication system. In this aspect, the server(s) receive a request corresponding to the widget. The database stores data for the widget. The authentication system performs an authentication corresponding to the request. The request is fulfilled if the authentication is successful. In one embodiment, the authentication system may be part of the server. In another embodiment, the authentication system may be separate from the server.

The method and system are mainly described in terms of particular systems provided in particular implementations. However, one of ordinary skill in the art will readily recognize that this method and system will operate effectively in other implementations. For example, the systems, devices, and networks usable with the present invention can take a number of different forms. For example, the method and system may not be limited to the Internet, but instead may be usable with other networks and/or devices, such as cellular telephones and other hand-held devices. The method and system are also described in the context of particular transactions being performed. One of ordinary skill in the art will recognize, however, that the method and system may be used in other transactions. The method and system will also be described in the context of particular methods having certain steps. However, the method and system operate effectively for other methods having different and/or additional steps not inconsistent with the present invention.

Figure 1:
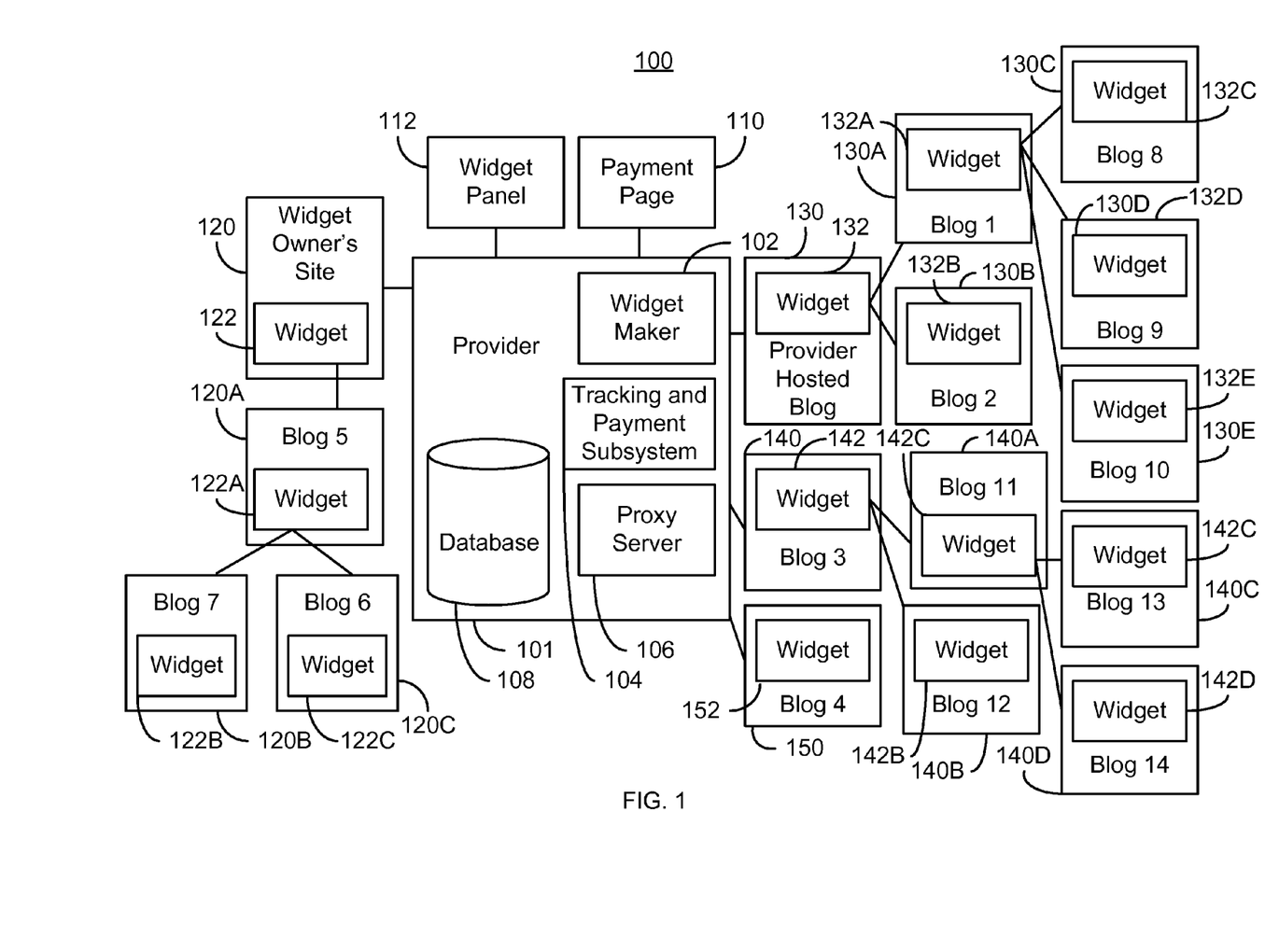
FIG. 1 depicts an exemplary embodiment of a system for performing transactions over the Internet utilizing widgets.

FIG. 1 depicts an exemplary embodiment of a system 100 for electronically performing transactions utilizing widgets. The system 100 may be used for various transactions such as electronic commerce, social payment transactions (e.g. fundraising), affiliate marketing, other social transaction such as sharing of multimedia, blogging, or other activities. The transactions may be performed through a variety of electronic media, for example via the Internet, through a cell network, using mobile phones, desktop computer systems, PDAs, laptop computer systems, or other electronic systems. Such transactions relate to events. For example, an organizer such as a particular cause or charity may desire to use the system 100 for events such as a fundraising campaign based only on Internet contributions, blograising performed in conjunction with a traditional (non-Internet based) fundraising campaign, campaigns that drive and track traffic to a particular Web site, campaigns that drive and track visitor actions, campaigns based on the occurrence of a particular event such as an ongoing fundraising campaign, in a campaign of limited duration, or for other purposes. Similarly, a couple getting married may use the system 100 to share information about the wedding and/or multimedia from the wedding itself, track guests, or otherwise communicate with interested individuals. In affiliate marketing, a business or other entity termed an organizer may use the system 100 serving up dynamic content to users, or viewers, of sites in the system 100. In order to facilitate such electronic transactions, the system 100 allows a widget owner to configure a widget, allows the widget to be disseminated, and may manage payments, rich media, and/or other data transmitted through the widget.

In the embodiment shown, the system 100 includes a provider 101. The provider 101 allows a widget owner to configure a widget, may host a widget, may enforce rules relating to the widget, may store data related to the widget owner, and perform other tasks related to the widget. The widget owner might be the organizer of the event or campaign and/or a content provider owning one of the widgets in the system 100. Coupled directly to the provider 101 are a site, or blog, 120 corresponding to a widget owner, a provider hosted blog 130, additional blogs 140 and 150. The widgets 122, 132, 142, and 152 are provided on blogs 120, 130, 140 and 150, respectively. In addition, blogs 120A, 120B, 120C, 130A, 130B, 130C, 130D, 130E, 140A, 140B, 140C, and 140D are shown as indirectly coupled with the provider 101. The blogs 120A, 120B, 120C, 130A, 130B, 130C, 130D, 130E, 140A, 140B, 140C, and 140D include corresponding widgets 122A, 122B, 122C, 132A, 132B, 132C, 132D, 132E, 142A, 142B, 142C, and 142D, respectively. The coupling with the provider 101 of the sites 120, 130, 140, 150, 120A, 120B, 120C, 130A, 130B, 130C, 130D, 130E, 140A, 140B, 140C, and 140D indicates that the widgets 122A, 122B, 122C, 132A, 132B, 132C, 132D, 132E, 142A, 142B, 142C, and 142D, respectively, are copies rather than physical connections. For example, the widget 122A is a copy of the widget 122. Thus, blogs 120A, 120B, 120C, 130A, 130B, 130C, 130D, 130E, 140A, 140B, 140C, and 140D may receive content from and provide content to the provider 101 directly. In addition, for simplicity a single widget 122A, 122B, 122C, 132A, 132B, 132C, 132D, 132E, 142A, 142B, 142C, and 142D is associated with each blog 120, 130, 140, 150, 120A, 120B, 120C, 130A, 130B, 130C, 130D, 130E, 140A, 140B, 140C, and 140D, respectively. However, in another embodiment, multiple widgets (not shown) may reside on a single site.

The provider 101 includes a widget maker 102 that may have a corresponding widget panel 112, tracking and/or payment subsystem 104, proxy server 106, and a database 108. The provider 101 might also provide a corresponding payment page 110, for example if transactions involving payment are provided through the provider 101. Thus, the widget maker 102, tracking and/or payment subsystem 104, widget panel 112, and database 108 may be controlled by and accessed through the provider 101. The owner of the provider 101 may, for example, charge a fixed fee or a percentage of donations for use of and services provided in connection with the system 100. Although shown together at the provider 101, the components 102, 104, 106, 108, 110, and 112 may be remotely located and/or owned in whole or in part by another entity. In another embodiment, at least some of the components 102, 104, 106, 108, 110, and 112 might be omitted. Use of such components also depends upon the transactions for which the system 100 is utilized. For example, if the system 100 is utilized for sharing of content not involving financial transactions and payment, the payment page 110 and payment portion of the subsystem 104 might be omitted. In addition, although only one of each component 102, 104, 106, 108, 110, and 112 are shown, multiple versions may be provided. In an alternate embodiment, the tasks of the components 102, 104, 106, 108, 110, and 112 may also be divided in another manner.

The widget maker 102, as well as the widget panel 112 may be used to configure widgets 122, 132, 142, 152, 122A, 122B, 122C, 132A, 132B, 132C, 132D, 132E, 142A, 142B, 142C, and 142D. For simplicity, the widget maker 102 is described in the context of the widgets 122, 132, 142, and/or 152. In operation, the widget owner utilizes the widget maker 102 in order to generate and customize the widget 122, 132, 142 and/or 152. In one embodiment, the widget maker 102 provides the widget panel 112, which is a user interface that allows the widget owner to provide input to the provider 101 to customize the widget 122, 132, 142 and/or 152. In one embodiment, the widget panel 112 is a page that allows the widget owner to select features of the widget 122, 132, 142, and/or 152. For example, the color, shape, event(s)/campaign(s) or other externalities associated with the widget 122, 132, 142, and/or 152, rich media, level of detail and other aspects of the widget 122, 132, 142, and/or 152 may be set based on the widget owner's elections in the widget panel 112. For example, the widget owner may specify that the widget 122, 132, 142, and/or 152 is to be associated with specific event(s), data sources, and/or content and may provide a profile for the type of events and/or content with which the widget 122, 132, 142, and/or 152 may be associated. The widget owner may also specify the location of fields, data within the fields, colors, and other features of the widget 122, 132, 142, and/or 152 through the widget maker 102. Thus, a single widget 122, 132, 142, and/or 152 may be configured to display information related to multiple events, ad campaigns, or other items in which the widget owner is interested.

The tracking and payment subsystem 104 may be used to track various attributes of the widgets and, in some embodiments, to make payments through the widget. For example, click throughs, number of times viewed, copies, or other ongoing attributes related to the widget may be tracked using the tracking and payment subsystem. In addition, the tracking and payment subsystem 104 may be utilized in managing the payments made and the payment page 110. The payment page 110 may be used to perform financial transactions, such as making payments and/or contributions associated with the widgets. The tracking and payment subsystem 104 may authenticate users and/or forms of payment, track payments, validate extraction of funds, validate and track payments and forms of payment made to content providers, and otherwise manage the actual funds provided to an event or paid out from an event. In one embodiment, the payments may be validated and held by the owner of the provider 101 or other designated third party (not shown) until a particular condition is fulfilled, for example the end of the fundraising campaign, sale, or other event. In such an embodiment, a widget owner may be allowed to extract some or all of the funds. In an alternate embodiment, payments may not be considered made and extraction of funds may not be allowed until the event closes. Further, the tracking and payment subsystem 104 may allow payments to content providers (e.g. widget owners of copies), widget owners of ancestor widgets, and/or other designated entities in a variety of forms including but not limited to cash or the equivalent, gift cards, or other items. The payment features provided through the tracking and payments subsystem 104 may include allowed forms of payment, event tracking, rules for extracting funds, the look feel of the payment page, and other data relating to payment. Although described as a single subsystem 106, the tracking and payment functions may be split into multiple subsystems.

The proxy server 106 may be used to replicate the widget(s) to other sites not associated with the widget owner or provider 101. For example, the proxy server 106 may be used to provide the widget 142D in the blog 140D. Furthermore, in one embodiment, the proxy server 106 may allow content, such as rich media audio or video, from site(s) not directly associated with the provider 101 to be played on the widgets. In one embodiment, widgets may communicate directly through the proxy server 101, for example to disseminate comments, donation amounts, and/or other information. Individual components of the provider 101 are discussed further below.

The database 108 may store data relating to the widget owner and the widgets hosted by the provider 101. For clarity the database 108 is described in the context of the widget 122. Thus, the database 108 may store the parameters and other data corresponding to the widget owner's selections for the widget 122, the identities of each widget and widget owner, as well as other data related to the widget owner. Thus, the widget data may be considered to include owner selected widget features, payment features (if any), and event features (if any). For example, widget features may include the content such as rich media displayed on the widget, thermometers or other mechanisms selected for tracking the progress of the campaign, colors, specific content providers authorized to host the widget, profiles of content providers authorized to host the widget, parameters related to dynamically updating the widget, and other data used in customizing the widget. The widget owner may also specify parameters corresponding to the ability of copies of the widget 122 to be customized. These parameters may also be stored in the database 108. Also stored in the database 108 may be relationships between widgets. For example, the database 108 may store the identity of the widgets 122, 122A, 122B, and 122C as well as an indication that 122A is a copy of 122, and that 122B and 122C are copies of 122A.

Although not separately shown, the provider 101 may include other components. For example, the provider 101 may include server(s) for rendering, authenticating, and performing other functions related to the widgets 122, 132, 142, 152, 122A, 122B, 122C, 132A, 132B, 132C, 132D, 132E, 142A, 142B, 142C, and 142D.

As discussed above, the sites 120, 130, 140, 150, 120A, 120B, 120C, 130A, 130B, 130C, 130D, 130E, 140A, 140B, 140C, and 140D contain corresponding widgets 122, 132, 142, 152, 122A, 122B, 122C, 132A, 132B, 132C, 132D, 132E, 142A, 142B, 142C, and 142D, respectively. The widgets 122, 132, 142, 152, 122A, 122B, 122C, 132A, 132B, 132C, 132D, 132E, 142A, 142B, 142C, and 142D dynamically display multimedia content. In one embodiment, the widgets 122, 132, 142, 152, 122A, 122B, 122C, 132A, 132B, 132C, 132D, 132E, 142A, 142B, 142C, and 142D are analogous to conventional widgets in that the widgets 122, 132, 142, 152, 122A, 122B, 122C, 132A, 132B, 132C, 132D, 132E, 142A, 142B, 142C, and 142D are used to display multimedia content, may be embeddable and portable, may be copyable, may be small in size, and may be less complex than typical applications. In one embodiment, the widgets 122, 132, 142, 152, 122A, 122B, 122C, 132A, 132B, 132C, 132D, 132E, 142A, 142B, 142C, and 142D may thus be embeddable code snippets, for example Flash, HTML, XML, XHTML, SBML, NET, Java, JavaScript, JSP, VisualBasic Applet or analogous applications. The widgets 122, 132, 142, 152, 122A, 122B, 122C, 132A, 132B, 132C, 132D, 132E, 142A, 142B, 142C, and 142D may be embeddable in a multitude of architectures, for example web pages, mobile phones, PDAs, and/or provided via email. In addition, because the widgets 122, 132, 142, 152, 122A, 122B, 122C, 132A, 132B, 132C, 132D, 132E, 142A, 142B, 142C, and 142D are embeddable, they may be self-replicating in nature. The widgets 122, 132, 142, 152, 122A, 122B, 122C, 132A, 132B, 132C, 132D, 132E, 142A, 142B, 142C, and 142D may also be viewed as the content appearing on the corresponding site 120, 130, 140, 150, 120A, 120B, 120C, 130A, 1320, 130C, 130D, 130E, 140A, 140B, 140C, and 140D, respectively, when the widget 122, 132, 142, 152, 122A, 122B, 122C, 132A, 132B, 132C, 132D, 132E, 142A, 142B, 142C, and 142D is rendered. In addition, although described herein as being rendered on a site that may be accessed through a browser (not explicitly shown), the widgets 122, 132, 142, 152, 122A, 122B, 122C, 132A, 132B, 132C, 132D, 132E, 142A, 142B, 142C, and 142D may not be limited to such environments. For example, the widgets 122, 132, 142, 152, 122A, 122B, 122C, 132A, 132B, 132C, 132D, 132E, 142A, 142B, 142C, and/or 142D may reside on a desktop, mobile phone, or other environment.

In one embodiment of the system 100, the widgets 122, 142, and 152 may be original widgets initially configured by their owners, rather than copies of another widget. For example, the widget owner's site 120 includes a widget 122 that is provided by the provider 101. Similarly, the sites 140 and 150 include the widgets 142 and 152, respectively, provided by the provider 101. In the embodiment shown, the widgets 122, 142, and 152 are configured by the widget owner(s) through the widget maker 102. Configuration of the widgets 122, 142, and 152, particularly as it relates to copies of the widgets 122, 142, and 152 is discussed below. In another embodiment, the widgets 122, 142, and 152 may be copies of another widget. For example, the widgets 142 and 152 might be copies of the widget 122.

The provider hosted site, or blog, 130 is shown as including a widget 132. For the purposes of describing the system 100, the widget 132 is related to the widget 122. In another embodiment, the provider hosted site 130 may include other widgets, for example corresponding to the widgets 142 and 152. As a result, every widget and/or it corresponding event might have its own URL. This unique address may be tied to a widget owner or individual and may symbolize a particular event or campaign. In one embodiment, the widget 132 and the widget 122 are substantially identical. In another embodiment, aspects of the widget 132 may be different from the widget 122. For example, the colors used or placement of fields may differ. These differences may be based upon the widget owner's preference as established during initial configuration of the widgets 122 and 132, or at some later modification of the widgets 122 and 132. In one embodiment, the widget owner configures both the widgets 122 and/or 132. In one embodiment, the widget owner may choose to have only the widget 122, only the widget 132, or both the widget 122 and/or 132 rendered on the sites 120 and 130.

In one embodiment, the widgets 122, 132, 142, and 152 are made using the widget maker 102. As discussed above, the widget owner may access the widget maker 102 through the widget panel 112. The widget maker 102 offers the widget owner the opportunity to provide parameters used in customizing the widgets 122, 132, 142, and/or 152. For example, the color, multimedia to be provided, tracking mechanisms allowed, ability of the widgets 122, 132, 142, and/or 152 to be copied, modifiability of the copies, inclusion of fields, location of fields, and other features of the widgets 122, 132, 142, and/or 152 may be specified through the widget maker 102. These parameters may be stored by the provider 101, for example in the database 108. In one embodiment, the widgets 122A, 122B, 122C, 132A, 132B, 132C, 132D, 132E, 142A, 142B, 142C, and 142D may be customized, at least to a limited extent, in a similar fashion. In addition, customization of a particular copy may be limited or otherwise controlled by customization of widget(s) from which the copy is derived. Such customization may take place through the widget maker 102 and/or through a widget editor (not separately shown in FIG. 1), which may allow for customization of copied widgets but not generation of new widgets. The widget editor may be considered to be part of the widget maker 102 or may be a separate component.

Although the original code from the widget maker 102 may reside with the provider 101, the widgets might be copied to other site(s). For clarity, such copying is discussed primarily in the context of widget 122. In one embodiment, the widget 122 may be copied through a field within the widget 122. In another embodiment, the widget 122 may be copied via the proxy server 106. In yet another embodiment, the widget 122 may be copied either through a field within the widget 122 or via the proxy server 106. Alternatively, a separate mechanism for copying the widget 122 might be provided. For example, the blog 120A includes a widget 122A that is a copy of the widget 122. Similarly, the blogs 120B and 120C include widgets 122B and 122C, respectively, that are copies of the widget 122A (and thus the widget 122). The blogs 130A and 130B include widgets 132A and 132B, respectively, that are copies of the widget 132. Blots 130C, 130D, and 130E include widgets 132C, 132D, and 132E, respectively, that are copies of the widget 132A and thus the widget 132. The blogs 140A and 140B include widgets 142A and 142B, respectively, that are copies of the widget 142. In addition, in one embodiment, copies can be made of previously copied widgets. For example, the blogs 140C and 140D include widgets 142C and 142D, respectively, that are copies of the widget 142A (and thus the widget 142). In one embodiment, the widget 142 might be a copy of the widgets 122 and/or 132. Alternatively, the widget 142 may be a distinct widget hosted by the provider 101. Thus, the widgets 122A, 122B, 122C, 132A, 132B, 132C, 132D, 132E, 142A, 142B, 142C, and 142D are copies of the widgets 122, 132, and 142. Stated differently, the widgets 122, 132, and 142 are ancestors of the widgets 122A, 122B, 122C, 132A, 132B, 132C, 132D, 132E, 142A, 142B, 142C, and 142D. As used herein, an ancestor widget is a widget from which another widget is copied. The widget, or copy, may but need not be updated based upon changes to the ancestor widget. For example, changes to an ancestor widget may, but need not, be pushed in real time to copies. In addition, multiple generations of ancestor widgets may be formed. For example, both the widgets 122 and 122A are ancestors of the widgets 122B and 122C. The widgets 122B and 122C are thus second generation copies of the widget 122 and first generation copies of the widget 122A.

Although described as copies, the widgets 122A, 122B, 122C, 132A, 132B, 132C, 132D, 132E, 142A, 142B, 142C, and 142D may not be identical to the widgets 122, 132, and 142. Instead, the widgets 122A, 122B, 122C, 132A, 132B, 132C, 132D, 132E, 142A, 142B, 142C, and 142D may be customized, at least to a limited extent, by the owners of the widgets 122A, 122B, 122C, 132A, 132B, 132C, 132D, 132E, 142A, 142B, 142C, and 142D. In particular, a widget owner may set the parameters of the widget 122, 132, and/or 142 to control the customization of copies 122A, 122B, and 122C, copies 132A, 132B, 132C, 132D, and 132E, and copies 142A, 142B, 142C, and 142D, respectively. Such customization is described below.

The provider 101 may be able to push data to one or more of the widgets 122, 132, 142, and 152, as well as to the widgets 122A, 122B, 122C, 132A, 132B, 132C, 132D, 132E, 142A, 142B, 142C, and 142D. Thus, data may be pushed to all of the widgets 122, 132, 142, 152, 122A, 122B, 122C, 132A, 132B, 132C, 132D, 132E, 142A, 142B, 142C, and 142D or a selected portion of the widgets 122, 132, 142, 152, 122A, 122B, 122C, 132A, 132B, 132C, 132D, 132E, 142A, 142B, 142C, and 142D. In order to determine to which widgets 122, 132, 142, 152, 122A, 122B, 122C, 132A, 132B, 132C, 132D, 132E, 142A, 142B, 142C, and 142D data is to be pushed, the relationships between widgets may be tracked and stored, for example in the database 108. For example, suppose data related to changes to the widget 122 is to be pushed only to first-generation copies. In such an embodiment, the relationship between the widgets 122 and 122A as well as the relationships between the widget 122 and the widgets 122B and 122C is utilized to determine that data should only be pushed to the widget 122A. Consequently, the relationships between, or ancestry of, the widgets 122, 132, 142, 152, 122A, 122B, 122C, 132A, 132B, 132C, 132D, 132E, 142A, 142B, 142C, and 142D may be tracked and/or stored by the provider 101. The ability to push data to widgets and/or their copies may be determined by the widget owners.

Further, a widget 122, 132, 142, 152, 122A, 122B, 122C, 132A, 132B, 132C, 132D, 132E, 142A, 142B, 142C, and/or 142D may be pushed to selected content providers (otherwise known as promoters) based upon the widget owner's preferences and characteristics of the content providers. These content providers may be considered to be widget owners for the copies of the widget on their site. For example, suppose the widget owner of widget 142 wishes to obtain contributions for a political campaign. The widget owner may indicate that certain sites having compatible political views, that are known to reach a particular audience, that relate to a particular geographic area, and/or that have a requisite level of effectiveness in obtaining contributions are desired. Such sites may be blogs 140A, 140B and 140C. Further, the content providers of the blogs 140A, 140B, and 140C may agree to host widgets for particular causes. If there is a match between the preferences of the widget owner and the content providers of the blogs 140A, 140B and 140C, the provider 101 may push the widget 142 for the political campaign to blogs 140A, 140B and 140C. Thus, the widgets 142A, 142B, and 142C may be provided. In return, the content providers (e.g. owners of the sites 140A, 140B, and 140C) may receive payment for hosting copies of the widget 142. In order to determine to which widgets 122, 132, 142, 152, 122A, 122B, 122C, 132A, 132B, 132C, 132D, 132E, 142A, 142B, 142C, and 142D were pushed to which sites, the relationships between widgets may be tracked and stored. For example, the widget 122 may be desired to be pushed to the site 120A, thereby providing widget 122A. Consequently, the relationship between the widget 122A pushed to the site 120A and the widget 122 may be stored in the database 108.

Thus, a widget 122, 132, 142, 152 and any copies may have both many-to-one and one-to-many capabilities. Stated differently, a single widget may be associated with multiple events, widget owners, or campaigns. In addition, a single fundraising event/campaign or events for a single organizer may be displayed on multiple widgets.

Data may also be encrypted by the data source provider and decrypted by the widget 122, 132, 142, 152, 122A, 122B, 122C, 132A, 132B, 132C, 132D, 132E, 142A, 142B, 142C, and/or 142D based on private/public key cryptography, encryption, DES variants, passwords, or other secure means. Each widget 122, 132, 142, 152, 122A, 122B, 122C, 132A, 132B, 132C, 132D, 132E, 142A, 142B, 142C, and 142D may also have identifiers, for example in a header. These identifiers may, for example, associate a widget with particular widget owner(s), particular widgets 122, 132, 142, 152, 122A, 122B, 122C, 132A, 132B, 132C, 132D, 132E, 142A, 142B, 142C, and 142D, particular event(s), and/or particular content provider(s). Thus, the identifiers may indicate from which ancestor widget a particular widget 122A, 122B, 122C, 132A, 132B, 132C, 132D, 132E, 142A, 142B, 142C, and 142D was replicated. The identifier may include multiple generations of ancestors and/or indicate where in the family tree of copies the widget fits. Thus, the ancestor relationships, such as parent-child relationships between widgets, as well as the degrees of separation between the generations of copies and their ancestor(s) may be tracked. The identifiers may, therefore, control of widgets 122, 132, 142, 122A, 122B, 122C, 132A, 132B, 132C, 132D, 132E, 142A, 142B, 142C, and 142D based upon their relationships to other widgets in the family tree. The identifiers may also allow the widget 122, 132, 142, 122A, 122B, 122C, 132A, 132B, 132C, 132D, 132E, 142A, 142B, 142C, and 142D to be validated and controlled, for example by the provider 101 and/or widget owner. When a user accesses a site, such as the site 120A, the provider 101 may render the widget 122A based upon the configuration selected by the owner of the ancestor widget 122 and the owner of the widget 122A, render the widget 122A based on preferences of the content provider, accept content from the widget 122A, allow and track payments via the widget 122A, push content to the widget 122A, and perform other tasks using the widget 122A, as described below. Analogous controls may also be exercised over copies of the ancestor widget.

Figure 2:
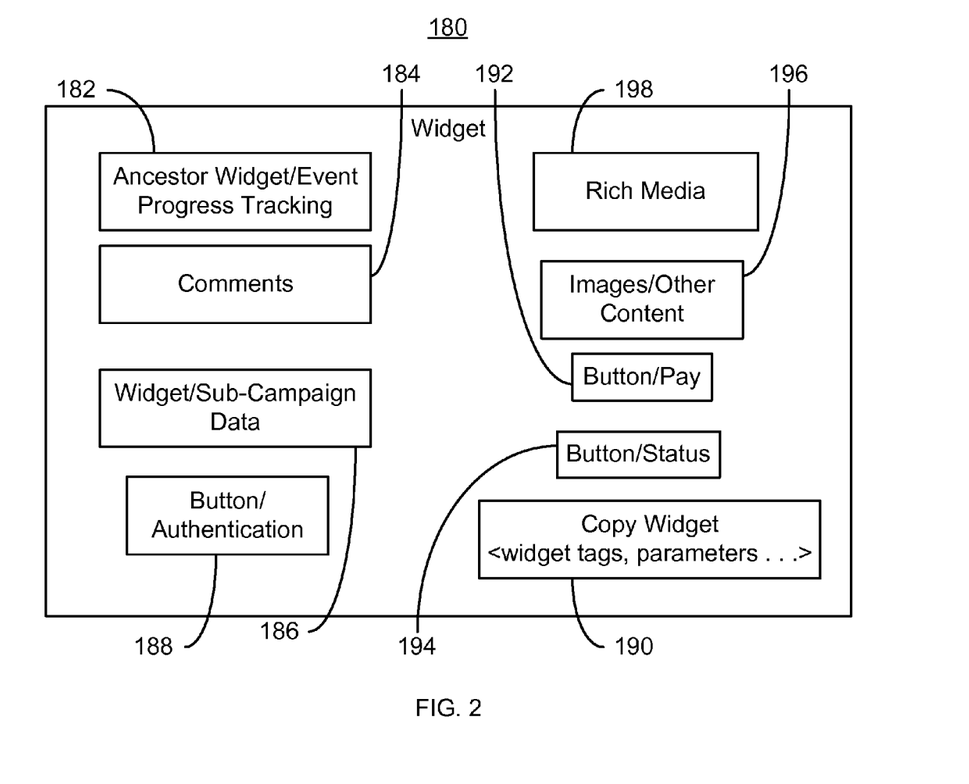
FIG. 2 depicts an exemplary embodiment of a widget for dynamically displaying multimedia content.

FIG. 2 depicts an exemplary embodiment of a widget 180 that may dynamically display multimedia content. The widget 180 may thus correspond to one or more of the widgets 122, 132, 142, 152, 122A, 122B, 122C, 132A, 132B, 132C, 132D, 132E, 142A, 142B, 142C, and 142D depicted in FIG. 1. Thus, the designations 180 and 122, 132, 142, 152, 122A, 122B, 122C, 132A, 132B, 132C, 132D, 132E, 142A, 142B, 142C, and/or 142D may be used interchangeably herein. Referring to FIGS. 1 and 2, the widget 180 includes fields 182, 184, 186, 188, 190, 192, 194, 196, and 198. The widget 180 may also include other information (not shown in FIG. 2)

such as the header described above. The widgets 122, 132, 142, 152, 122A, 122B, 122C, 132A, 132B, 132C, 132D, 132E, 142A, 142B, 142C, and 142D may include some or all of these fields 182, 184, 186, 188, 190, 192, 194, 196, and 198 as well as other fields (not shown). Moreover, although only one of each field 182, 184, 186, 188, 190, 192, 194, 196, and 198 are shown, multiple versions of one or more of the fields 182, 184, 186, 188, 190, 192, 194, 196, and 198 might be included. For example, multiple rich media fields 198, multiple images/content fields 196 and multiple fields 182 for tracking an event associated with a widget may be included. In addition to the fields 182, 184, 186, 188, 190, 192, 194, 196, and 198, the color and other aspects of the widget 180 may be customized. Configuration of the fields 182, 184, 186, 188, 190, 192 194, 196, and 198 may thus be part of customization of the widget 180. For example, the inclusion of, size, and placement of the fields 182, 184, 186, 188, 190, 192, 194, 196, and 198 may differ between the widgets 122, 132, 142, 152, 122A, 122B, 122C, 132A, 132B, 132C, 132D, 132E, 142A, 142B, 142C, and 142D.

The field 182 may be used in tracking attributes related to the widget 180 or widget(s) from which the widget 180 was copied. For example, an event associated with the widget 180, such as a fundraising campaign, may be tracked in the field 182. The tracking mechanisms, such as a thermometer, status bar, and/or count down clock, may provide real time views of the event in the field 182. Other features that may be tracked and depicted, for example in the field 182 may include data such as a fundraising or other goal, event start time and duration, and the type of output for each event. Upon a refresh request and/or periodically based upon a widget owner and/or provider set preferences, the event progress tracking mechanisms in the field 182 may be updated by the provider to reflect any changes in the event. For example, upon donation from any of the widgets 122, 132, 142, 152, 122A, 122B, 122C, 132A, 132B, 132C, 132D, 132E, 142A, 142B, 142C, and 142D depicted in FIG. 1, the provider 101 may push data to all (or some subset of) the widgets 122, 132, 142, 152, 122A, 122B, 122C, 132A, 132B, 132C, 132D, 132E, 142A, 142B, 142C, and 142D to reflect the change in the amount received. Thus, the level of a thermometer or status bar in the field 182 may change based upon real-time events. The tracking mechanisms can be provided for the campaign(s) associated with the event or provider, sub-campaigns, as well as other externalities that are of interest to the widget owner. For example, the owner of the widget 122A may initiate a sub-campaign for a fundraising campaign associated with the widget 122. The widgets 122B and 122C may then be associated with the sub-campaign, as well as the campaign. Consequently, the viewers of the widgets 122B and 122C might make donations using the widgets 122B and 122C, respectively.

Field 186 may be similar to field 182. Tracking of sub-campaigns or other attributes related to widgets that are copies of an ancestor widget may be provided in field 186. For example, the field 186 may be used to track the progress of a sub-campaign in the context of a larger fundraising campaign tracked in the field 182. For example, status bars, thermometers, or other mechanisms that track attributes of the copy may be provided in field 186. Note that if the widget 180 is a copy of another widget, the tracking provided in field 186 may be for attributes selected by the owner of the widget 180. The field 182 may then display tracking of attributes of an ancestor widget. Conversely, if the widget 180 is an ancestor of another widget, the field 182 may provide tracking for attributes originally selected by the owner of the widget 180. The field 186 may then be provided at a later date if the owner of the widget 180 desires to track attributes of a copy.

Comments may be made and/or displayed in the comments field 184 and/or in the rich media field 198. Comments may be in textual or rich media format including video and audio. The widget 180 may also include rich media customized by the widget owner or other content provider in field 198. For example, a widget owner can choose to include images as well as audio and/or video messages to encourage users to make a donation, perform some other action, or simply share content. Content providers might also be allowed add their own content to the widget on their site and copies thereof. For example, the widget owner for site 130D may be allowed to add their own rich media content to the widget 132D in the field 198. The provider 101 renders such rich media when the site hosting 130D the widget 132D is accessed by a user. In one embodiment, the rich media discussions/comments in fields 184 and 198 may be published in real time throughout all widgets that are related to a particular widget regardless of from where the widget is being hosted. Thus, threaded text and rich media discussions/comments may be provided via the widgets 180 themselves. In addition, comments provided via one of the widgets 122, 132, 142, 152, 122A, 122B, 122C, 132A, 132B, 132C, 132D, 132E, 142A, 142B, 142C, and 142D may be disseminated by the provider 101 to all or a subset of the widgets 122, 132, 142, 152, 122A, 122B, 122C, 132A, 132B, 132C, 132D, 132E, 142A, 142B, 142C, and 142D upon a refresh request and/or periodically based upon organizer and/or provider set preferences.

The buttons 188, 192, and 194 may have various uses. Although only three buttons 188, 192 and 194 are shown, fewer or more buttons may be provided. In one embodiment, the button 194 is a status button. The status button 194 provides a mechanism for viewing further details relating to the event or other externality associated with the widget 180 and/or owner of the widget 180.

The button 192 may be a payment button. The payment button 192 may allow users to make payments through the widget 180 without leaving the site hosting the widget 180. Such a payment might, for example, be for electronic commerce or fundraising. In one embodiment, selection of a payment button 192 by a user results in the corresponding organizer-configured payment page 110 being accessed. The user may then make a payment that is managed by the tracking and payment subsystem 104. The payment features that may correspond to the payment button 192 may include allowed forms of payment, event tracking, rules for extracting funds, the look and feel of the payment page 110, and other data relating to payment. The payment button 192 may also refer the user to another site (not shown) through which payment may be made. Such a site might, but need not, be associated with the provider 101.

In addition, the widget 180 may be authenticated, which facilitates payment through the widget 180. For example, the button 188 may be an authentication button. A user may click on the authentication button 188. The widget 180 may then make a call back to one or more authentication services. The authentication received is passed back to the widget 180. Alternatively, a widget 180 may automatically and/or periodically request authentication and present this to the user in the field 188. This communication with authentication services may be performed via the provider 101 and/or through a third party. The authentication allows a user to have a greater level of assurance that payment through the widget 180 is secure.

Authentication of the widget 180 may be extended to other embeddable applications, such as Flash applications. The authentication process may also use an embedded, dynamically generated by a third party, site seal (not shown) on the widget 180. This embeddable seal may be provided in the form of a code snippet (not shown) by a third party authentication firm to be embedded in the organization's widget. Before a widget owner embeds the code snippet, they complete a validation process with the third party. Once authorized, embedded, and published live on the Internet, the user of the widget 180 sees a dynamically generated seal directly within the widget 180 that may also include dynamically generated code specific to that widget 180 from the third party authentication firm. Such a seal may be provided in the field 188. When a user clicks on the seal, they are taken to the trusted third party's site to authenticate that the widget 180 is registered with the third party and to view any security levels, if present, that protects the user of widget 180. Upon arriving at the third party site for validation, the user may enter a code that is present on the seal. If the code entered matches what the third party expects for that seal, the profile of the company and other attributes are shared with the user. The third party may also use URL information to ensure, if desired, that a widget 180 is being hosted on a Web page or other Internet host medium, if URL information is required as part of the authentication process. This might include an additional check that the source code of the widget 180 remains with the trusted third party and/or has been checked by the third party and that the user is viewing an un-tampered version of a widget 180 based on digital signature credentials embedded in the widget 180 by the third party firm. The seal may also include dynamically generated content directly into the widget 180 that shows information including the current date and time to show visitors authentication information without having the visitor click through that the widget.

The widget 180 may also include a copying field 190. As discussed above, the widget 180 may also be self replicating and may, therefore, be copied and placed in multiple sites by multiple content providers. To facilitate this feature, the copying field 190 may be provided. The copying field 190 may allow copying of the widget 180 through the widget 180. In one embodiment, the copying field 190 provides a link that displays the code for the widget 180 and allows a user to copy and paste the code to another site. Consequently, a separate field (not shown) or a link to a different site for replicating the widget need not be provided. However, in an alternate embodiment, the link to a different site may be provided and used. Moreover, a content provider may be allowed to customize the widget 180 at least to a limited extent. In one embodiment, this customization may be limited by the widget owner of the ancestor widget, as described below. Thus, replications or copies of a widget 180 may not be identical to the widget 180. For example, the code for the widget includes an identification of the event(s) with which the widget is associated and parameters related to the size, shape, and color of the widget. The copier of the widget 180 may be allowed change and/or add to the event(s) with which the widget is associated and alter the parameters to change the size, shape, and/or color of the widget displayed on the content provider's site. However, such changes may be limited or excluded by the owner of the ancestor widget.

Although copying may be performed through the field 190, in one embodiment, the original code for the widget 180 resides with the provider. Consequently, upgrades, changes to the widget configuration made by the widget owner, and other content may be pushed from the provider 101 to the widget 180. Such changes may also be pushed to some or all of the widget 180 copies. Embedded in the copied code may be a reference to the ancestor widget as well as a new identification to identify the copied widget. In addition to copying, an email may be requested so that the user copying the widget may request set up of an account identifying that user as the copier of that widget 180 and thus retaining any tracking, benefits, or rewards as a result of traffic generated from the copied widget.

In addition to being copied through the copying field 190, in some embodiments, the widget may be copied to other sites through the proxy server 106. In particular, the widget owner, the provider 101, or another content provider may wish to replicate the widget on other site(s) not directly associated with the provider 101. In order to do so, the proxy server 106 may provide an indirect connection to the other site(s), credential the site(s), and replicate the widget 180 to the site(s). Furthermore, the proxy server 106 may allow content, such as rich media audio or video, from site(s) not directly associated with the provider to be played on the widget 180. In addition, widgets may communicate directly through the proxy server, for example to disseminate comments, donation amounts, and/or other information.

Use of the system 100 and widget 180 may facilitate electronic transactions. Because the widget may be copied and further customized, sub-campaigns or other subsets of content of interest to copier(s) of an ancestor widget may be formed and tracked through the widget 180. For example, a content provider may copy a widget 180 to his or her own site. Thus, widgets such as the widget 122A on the site 120A may be provided from another widget 122 on another site 120. The widget owner of the copy (copy owner) may then be allowed to add a sub-campaign or other features to the copy. In a preferred embodiment, the copy owner registers with the ancestor widget owner (via the provider 101) in order to do so. For the purposes of discussion, the features that may be added or changed are described in the context of sub-campaigns. However, one of ordinary skill in the art will recognize that the modifications are not limited to sub-campaigns. The copy owner may be allowed to specify the terms of the sub-campaign within the context of the campaign, but generally would not be authorized to alter the specifications of the campaign. The sub-campaign might be considered to be a group payment from contributors to the sub-campaign. Such a sub-campaign may be tracked, including using tracking mechanisms, such as the tracking and payment subsystem 104, in a manner analogous to the campaign. For example, the widget owner of the ancestor widget may initiate a fundraising campaign for one million dollars and provide a campaign thermometer in the field 182 of the corresponding widget 180. A copy owner might initiate a sub-campaign for five hundred dollars. This sub-campaign would be provided in field 186 on a copy of the widget 180, further customized, and placed on the copy owner's or other site (e.g. their blog). The copy of the widget 180 corresponding to the sub-campaign may provide event progress tracking in the form of a sub-campaign thermometer in the field 186. The sub-campaign might include any contributions made through the copy owner's widget and copies of the copy owner's widget. A contributor may make a fifty dollar contribution to the sub-campaign. The provider 101 may then update both the campaign thermometer in field 182 and the sub-campaign thermometer in field 186. Although the fifty dollar contribution would not significantly alter the campaign thermometer, such a contribution may be visible on the sub-campaign thermometer in the copy owner's widget. Thus, further contributions are facilitated. Consequently, electronic financial transactions may be facilitated.

Data related to contributions through the widgets 122, 132, 142, 152, 122A, 122B, 122C, 132A, 132B, 132C, 132D, 132E, 142A, 142B, 142C, and 142D may also be tracked. As discussed above, in one embodiment payments, for example for electronic commerce or fundraising, may be made through any of the widgets 122, 132, 142, 152, 122A, 122B, 122C, 132A, 132B, 132C, 132D, 132E, 142A, 142B, 142C, and 142D. Various aspects of payments made and other features of the widgets 122, 132, 142, 152, 122A, 122B, 122C, 132A, 132B, 132C, 132D, 132E, 142A, 142B, 142C, and 142D may be tracked. For example, the number and amount of payments made through a widget and/or its copies, the number of visits to the widget and/or its copies, the time the widget and/or its copies have been available, the amount of time taken by the widget and/or its copies to receive donations, user comments, and other data related to the widget may also be tracked by the provider 101. This tracking might be performed by the tracking and payment subsystem 104 or another component (not shown). As a result, the provider 101 may determine an effectiveness for various sites 120, 130, 140, 150, 120A, 120B, 120C, 130A, 130B, 130C, 130D, 130E, 140A, 140B, 140C, and 102D and/or widgets 122, 132, 142, 152, 122A, 122B, 122C, 132A, 132B, 132C, 132D, 132E, 142A, 142B, 142C, and 142D. In one embodiment, an effectiveness percentage is determined based upon the number of views of a widget 122, 132, 142, 152, 122A, 122B, 122C, 132A, 132B, 132C, 132D, 132E, 142A, 142B, 142C, and/or 142D, the number of donors through the widget 122, 132, 142, 152, 122A, 122B, 122C, 132A, 132B, 132C, 132D, 132E, 142A, 142B, 142C, and/or 142D, the average contribution per donor, the aggregate donation through the widget 122, 132, 142, 152, 122A, 122B, 122C, 132A, 132B, 132C, 132D, 132E, 142A, 142B, 142C, and/or 142D, and analogous data for copies of the widget 122, 132, 142, 152, 122A, 122B, 122C, 132A, 132B, 132C, 132D, 132E, 142A, 142B, 142C, and/or 142D. Based on this effectiveness percentage, organizers may determine the content providers that are desired for particular campaigns.

Although the widgets 122, 132, 142, 152, 122A, 122B, 122C, 132A, 132B, 132C, 132D, 132E, 142A, 142B, 142C, and 142D may be copied, pushed to other sites, sub-campaigns or other subsets of interest formed, customized, these and other dissemination of the original widgets 122, 132, 142, and 152 may be moderated. Moderation allows the widget owner to control the sites with which their widget, event, and the widget owner themselves are associated. For example, the widget owner may authorize only specific sites and/or sites fitting a particular profile to host the widget 122, 132, 142, and/or 152. The provider 101 does not push the widget to sites not authorized by the organizer. If an unauthorized content provider or other unauthorized user copies the widget 122, 132, 142, and/or 152, then action may be taken based upon the widget owner's preferences. For example, when the unauthorized copier's site is accessed, the provider 101 may send a message to the widget owner requesting validation. In some embodiments, the widget may not be rendered until the widget owner has expressly approved for the site. Alternatively, the widget may be rendered unless and until the widget owner has expressly disapproved the site.

The widgets 180 may also reflect local data. The widget 122, 132, 142, 152, 122A, 122B, 122C, 132A, 132B, 132C, 132D, 132E, 142A, 142B, 142C, and/or 142D may be provided to multiple sites in a variety of ways, such as copies of widgets from the widget owner's site 120, copies of widgets 132 from provider's site 130, and copies of widgets from other content provider's (copier's) sites. In one embodiment, the widget 122, 132, 142, 152, 122A, 122B, 122C, 132A, 132B, 132C, 132D, 132E, 142A, 142B, 142C, and/or 142D may be configured to account for at least some of these local conditions. For example, the field 182 may display the donations using the local currency and indicate relevant times using the local time. In order to do so, the widget 180 may query the local computer system hosting the site to obtain local data, such as the time and/or language. The widget 180 may then convert various components to reflect the local data. For example, the language may be translated to the local language and/or the time of relevant occurrences such as the event ending may be updated to reflect the local time.

The widgets 180 may also be reusable. The widget 180 may be copied and/or pushed to sites. Once a widget 180 resides on a site, it may remain on the site unless and until expressly removed by the site owner or the provider 101. Furthermore, data may be pushed to widgets 122, 132, 142, 152, 122A, 122B, 122C, 132A, 132B, 132C, 132D, 132E, 142A, 142B, 142C, and 142D by the provider 101. A widget 180 may be generally associated with particular event(s) that have specific closing dates, such as a fundraising campaign, a wedding, a birthday, an ad campaign, or other event. Once the event closes or for some other reason the widget 180 is no longer associated with the event, the widget 180 may be available for reuse. The widget 180 may be reused by the provider 101 pushing data to the widget 180 and/or by the owner of the widget 180 re-customizing the widget 180 for new events. For example, when configuring the widget 180, a widget owner may indicate that once an event has closed, specific content is to be pushed to the associated widgets. This content could be a thank you message, an indication of other events that may be of interest to the content provider, or settings that reconfigure the widget 180 for another event. Similarly, a widget owner might reconfigure the widget 180 to be associated with another event or indicate to the provider 101 that the widget 180 may be reused for other events meeting certain criteria. In one embodiment, these types of reuse may be possible for both the ancestor widget and its copies.

The provider 101 may push new settings and parameters to the widgets 122, 132, 142, 152, 122A, 122B, 122C, 132A, 132B, 132C, 132D, 132E, 142A, 142B, 142C, and 142D residing on other sites based on widget owners' specifications. A widget owner might specify that the widget 180 on its site is available for causes fitting particular profiles. For example, the owner of the widget 142D may specify that only certain ad campaigns or other data may be pushed to its widget. In one embodiment, these specifications must also fit within specifications provided by owners of the ancestor widgets 142 and 142A. The provider 101 may then push data to the widget 142D on the site 140D to reuse the widget 142D for events or other data fitting the profiles. The owner of the site 140D and/or widget 142D may be paid or otherwise rewarded for use and/or reuse of the widget 142D on the site 140.

The widget 180 may also "mature" and increase in value to both the widget owner and his/her audience. For example, assume that the widget 180 is a copy (e.g. widget 122A, 122B, or 122C) of another widget (e.g. 122), associated with a particular entity such as a business, and/or provides content from another entity. In such an embodiment, the system 100 may be used in affiliate marketing. The widget 180 may be used in affiliate marketing to dynamically display form, content, and functionality based on the cumulative actions taken by previous visitors during the life of the campaign, as well as on actions taken by the current visitor, and based on the rules, logic, and settings defined by the promoter, the organizer, and, optionally, the provider 101. Thus, for each action taken, the widget 180 may be dynamically modified if either the promoter (widget owner) or organizer (entity associated with the marketing campaign) set up a rule to modify the widget. For example, a visitor clicks through and makes a contribution to a non-profit. The widget 180 might be updated by a setting such as: adding the visitor's contribution amount to a campaign goal both visually in a graph and textually the number of contributors can be increased by one or posting the name or initials of the latest contributor on the widget. Such changes may be displayed in the field 182, 184, and/or 198. If a visitor contributes the final incremental amount needed to meet a campaign goal, the widget 180 might be updated to show a success image, to not accept any more click through for donations, to provide a special thank you message can appear, and/or have the widget's the look and feel changed. Other examples may be found in voter registration, mailing lists, or purchasing. A visitor may click through and complete a form such as an online voter registration form. In response, the widget 180 may be changed to show that one more person has taken the requested action. A visitor who clicks through and signs up for a mailing list may be the one thousandth person to do so from this widget 180. The widget 180 may be changed to now add a video/audio file that only shows up on widgets 180 that drive at least one thousand signups. A visitor clicks who through and makes a purchase may be the one hundredth purchaser through this widget 180. The widget 180 may now show a twenty percent discount message and content. Moreover, all future purchasers may receive the same discount. The types of actions, content changes, form changes, link changes, and element changes are not limited to the examples above. Rather the promoter and the organizer have free control over the rules to apply to actions taken by visitors. These rules, settings, and content may be configured and controlled via a Control Panel, such as the widget panel 112 discussed above.

Similarly, as the number of actions recorded from the widget 180 increases, the widget 180 may take on increased functionality and/or allow for a higher level of reward and/or recognition from the owner of the ancestor widget or other entity to which data on the widget corresponds. The audience for the widget 180 may share in the value by either having a better experience (due to the increased features/functions on the widget 180) or share in promotions/discounts passed on by the owner of the ancestor widget or other entity to which data on the widget corresponds. The increase in value (through functionality or other features) of the widget 180, as well as the event(s) and/or actions triggering an increase in maturity may be controlled all or in part by the owner of the ancestor widget or other entity to which data on the widget corresponds. These actions may also provide unprecedented data mining to the owner of the ancestor widget or other entity to which data on the widget corresponds. These entities may wish to track how social networks interact with content and actions. For example, in affiliate marketing applications, the method and system may provide significant advantages including but not limited to increased value to not only the organizer, but also the promoter and the promoter's audience.

Thus, using the system 100 and the widget 180, electronic transactions may be facilitated. Such transactions may include financial transactions and social transaction. Benefits may be provided to the widget owner, the owner(s) of copies of the widget and other providers, as well as users/viewers of the widget.

The system 100, particularly the widgets 122, 122A, 122B, 122C, 132, 132A, 132B, 132C, 132D, 132E, 142, 142A, 142B, 142C, 142D, and 180, may be desired to be authenticated. For example, applications for the system 100 might include financial transactions, medical records, personnel information, sharing of multimedia content such as movies and/or music, and other. Thus, authentication may be desired. For example, it may be desirable to authenticate the widgets 122, 122A, 122B, 122C, 132, 132A, 132B, 132C, 132D, 132E, 142, 142A, 142B, 142C, 142D, and 180 themselves, requests from the 122, 122A, 122B, 122C, 132, 132A, 132B, 132C, 132D, 132E, 142, 142A, 142B, 142C, 142D, and 180, and/or other requests related to the widgets 122, 122A, 122B, 122C, 132, 132A, 132B, 132C, 132D, 132E, 142, 142A, 142B, 142C, 142D, and 180.

Figure 3:
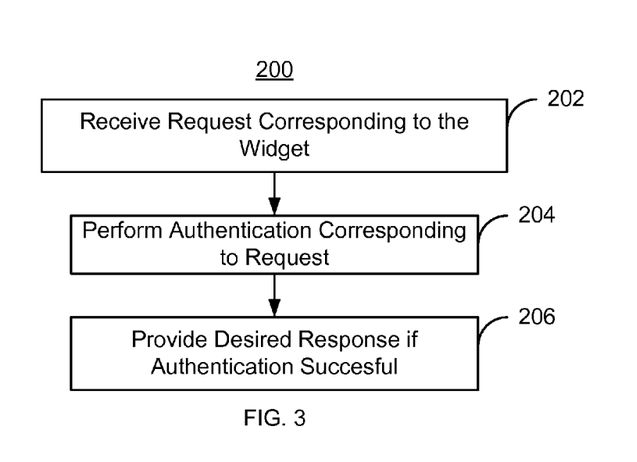
FIG. 3 depicts an exemplary embodiment of a method for authenticating a widget.

FIG. 3 depicts an exemplary embodiment of a method 200 for authenticating a widget. The widget is portable, embeddable and for dynamically displaying multimedia content. The widget may be configured using the system described above. As part of the configuration of the widget, authentication for various features and/or tasks may be required. For simplicity, the method 200 is described in the context of the widget 122 depicted in FIG. 1 as well as the widget 180 depicted in FIG. 2. However, the method 200 also applies to the remaining widgets 122A, 122B, 122C, 132, 132A, 132B, 132C, 132D, 132E, 142, 142A, 142B, 142C, 142D, and 152. In addition, although steps of the method 200 are depicted as occurring in a particular order, one or more of the steps may be performed in another order, in parallel, or multiple times.

Referring to FIGS. 1-3 a request corresponding to the widget 122 is received, via step 202. In one embodiment, the request is for the widget 122. For example, a host application such as a browser may request the widget. In another embodiment, the request may be from the widget 122. For example, a request to access a site or server, a request to make a payment, a request to obtain certain content and/or a request to perform some other task(s) is received. The request may be received by the provider 101. In one embodiment, the request is received by a server (not explicitly depicted in FIG. 1) for the provider. However, the request may be to another entity. Such an entity might include a third party authentication service and/or an entity that performs authentication.

An authentication corresponding to the request is performed, via step 204. In one embodiment, a site 120 on which the widget 122 resides, a host application (not shown) used to view the site 120/widget 122, the widget 122 itself, and/or server or other component used by the widget 122 may be authenticated. In one embodiment, it is determined in step 204 whether the entity making the request is authorized to receive the requested content. Step 204 may be performed by referring the requesting entity to another site. For example, a host application, the widget 122 itself, or other entity may be referred to the new site. The new site may correspond to an authentication service. The authentication may be performed using encryption, private/public key cryptography, DES variants, passwords, or other secure means. For example, the widget 122 and site desired to be accessed from the widget 122, such as the site 150, might exchange keys. The authentication performed in step 204 may include ensuring that the keys match. If so, then authentication of the widget 122 and/or site 150 may be considered to be successful. Alternatively, encrypted code may be provided to/from the widget 122. The widget 122 may then attempt to decode the encrypted code. Only an authorized widget is desired to be capable of decrypting the encrypted code. The authentication includes determining whether the decoding has been accomplished as required. If so, the authentication in step 204 is successful and the widget 122 is considered to be successfully authenticated.

If the authentication performed in step 204 is successful, then the appropriate response is provided, via step 206. In one embodiment, step 206 may include providing the widget 122, for example in response to successful authentication of the site 120 or the widget 122. In another embodiment, the response to successful authentication may be to allow content to be provided to the widget, allow particular task(s) to be performed, and/or allow the widget 122 and/or host application to access another uniform resource identifier (URI).

Thus, using the method 200, authentication may be performed. The trustability of transactions involving the widget 122 may, therefore, be improved. Consequently, utility of the system 100 may be improved.

Figure 4:
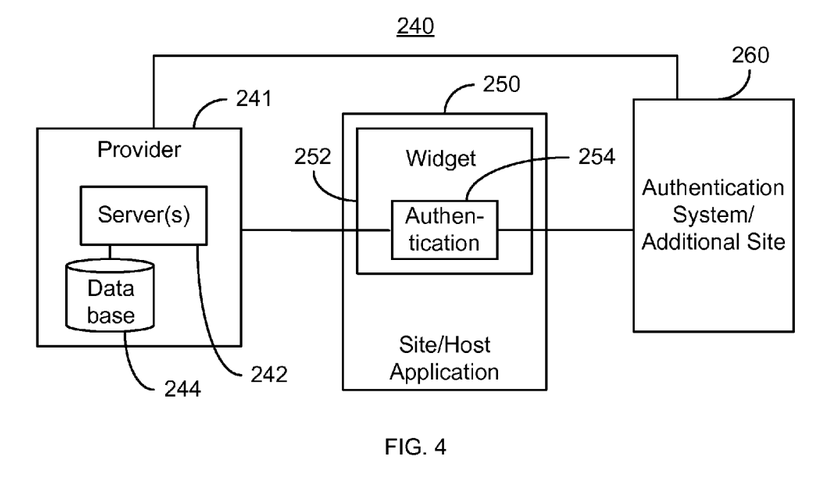
FIG. 4 depicts an exemplary embodiment of a system for authenticating a widget

FIG. 4 depicts an exemplary embodiment of a system 240 for authenticating a widget. The system 240 includes a provider 241, a site that may be viewed using a host application (site/host application) 250, and authentication service 260 at a location different from the provider 241. Although shown separately, in one embodiment, the authentication system 260 may reside within the provider 241, for example in the server (s) 242. However, in another embodiment, the authentication system 260 may be used by a third party authentication service to perform authentication related to the widget 252.

The provider 241 corresponds to the provider 101 depicted in FIG. 1. The provider 241 thus includes server(s) 242 and database 244. In addition, other components (not shown) may also be part of the provider 241. Such additional components include but are not limited to a widget maker for configuring widgets, a widget editor for modifying existing widgets, tracking subsystems, payment subsystems, or other components used for performing tasks related to the widget 252.

The site/host application 250 includes the widget 252. In one embodiment, the widget may include an optional authentication subsystem 254. The authentication subsystem 254 might be used in accessing the authentication system 260 and/or provider 241 to authenticate the widget 252 itself, particular transactions performed using the widget 252, the user of the widget 252, particular URIs, and/or to provide a field analogous to the authentication field 188 shown in FIG. 2.

Referring back to FIG. 4. In order to perform authentication, the authentication subsystem 254 may make a request to the provider 241 and/or the authentication system/additional site. Such a request may be specifically for authentication or may be for a service, feature and/or other attribute that requires authentication. A request to the provider 241 may be authenticated by the provider 241, for example through the server(s) 242. Alternatively, the provider 241 may call the authentication system 260. The request to the authentication system 241 may specifically be for authentication or for another item. For example, the widget 252 may request code from the authentication system 260 that may require that the widget 252 be authenticated.

Figure 5:
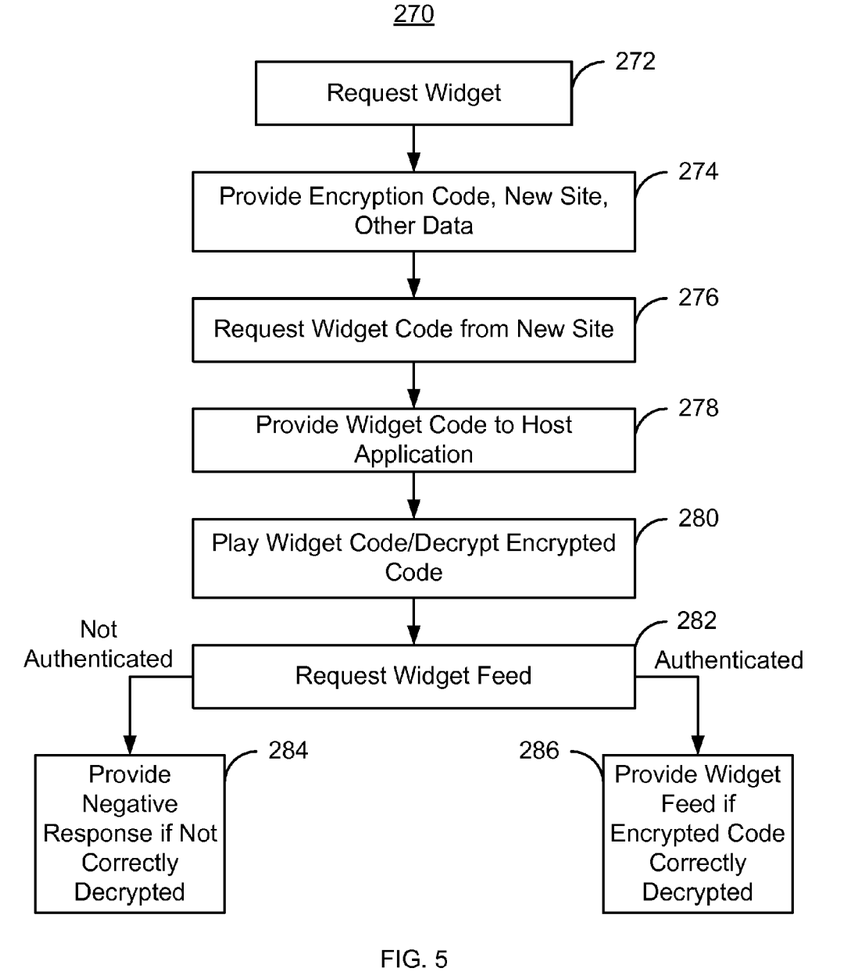
FIG. 5 depicts another exemplary embodiment of a method for authenticating a widget.

FIG. 5 depicts another exemplary embodiment of a method 270 for authenticating a widget. The widget is portable, embeddable and for dynamically displaying multimedia content. The widget may be configured using the system described above. As part of the configuration of the widget, authentication for various features and/or tasks may be performed. For simplicity, the method 270 is described in the context of the widget 252 depicted in FIG. 4 as well as the widget 180 depicted in FIG. 2. However, the method 200 also applies to the remaining widgets 122, 122A, 122B, 122C, 132, 132A, 132B, 132C, 132D, 132E, 142, 142A, 142B, 142C, 142D, and 152. In addition, although steps of the method 210 are depicted as occurring in a particular order, one or more of the steps may be performed in another order, in parallel, or multiple times.

Referring to FIGS. 2, 4, and 5, the method 270 may commence once the host application attempts to access a site containing a widget. Stated differently, the method may commence when a viewer's host application, such as a browser, accesses the code for the site to be viewed. This code refers to the server 242 in order to obtain the widget. Thus, the site/host application 250 requests the code for the widget 252, via step 272. In one embodiment this request is provided to the provider 241. More specifically, the request may be provided to the server(s) 242. This request may provide information about the host application, such as the IP address of site 250 on which the widget 252 is to reside and a widget identification (ID).

In response, the host application/site 250 may be referred to another site such as the site 260 for the authentication system, via step 274. The response provided in step 274 may also include items such as a session identification (session ID) and an encrypted, or secret, code or token. The secret/encrypted code or token is used to authenticate the widget. In addition, the server 242 may store the information provided in the request, for example in the database 244. The session ID may used to track communications with the widget 252. In one embodiment, the server 228 may provide the URI for the site 260. Alternatively, the server 252 may provide the code for the widget 252. Thus, step 274 may provide a location from which the widget 252 may be obtained as well as the secret token or other code for identification purposes that may be decoded only by an authorized widget. As used herein, the encrypted code is one which may be decoded only by an authorized widget. In one embodiment, this code may be dynamically generated and depend upon certain real time factors, may contain certain algorithms that are only known to hosts and widget, and may be generated by some process such that only an authorized widget can decode.

The host application/site 250 makes a request for the widget code, via step 276. In one embodiment, this is performed by the host application/site 250 making a request to the new URI including the widget ID and the session ID. The code for the widget 252 may then be provided to the host application/site 250, via step 278. The widget code may then be loaded and executed by the host application/site 250. Thus, the widget 252 may run.

The widget 252 may then decode the encrypted code, via step 280. The widget 252 provides a response to the server 242 with a request for its content, via step 282. This content may also be termed a widget feed. If the response is not appropriate for the token, the server 228 may refuse to provide the widget feed, disable the widget 252, and/or provide another response appropriate for an unauthorized widget, via step 284. However, if the server 242 determines that the widget 252 is authorized, the server 242 may provide the widget feed to the widget, via step 286. Thus, the widget has been authenticated. In one embodiment, additional features, such as the payment button 192 or certain video or audio, may be unlocked using an analogous process. Consequently, the widget 252 is rendered on the site 250.

Thus, using the methods 200 and 270 and/or the system 100 and 240, widgets, sites, servers, and/or other requests may be authenticated. As a result, the trustability of the methods 200 and 270 and the system 100 and 240 may be improved.

A method and system for authenticating requests related to widgets have been disclosed. The present invention has been described in accordance with the embodiments shown, and one of ordinary skill in the art will readily recognize that there could be variations to the embodiments, and any variations would be within the spirit and scope of the present invention. For example, the present invention can be implemented using hardware, software, a computer readable medium containing program instructions, or a combination thereof. Software written according to the present invention is to be either stored in some form of computer-readable medium such as memory or CD-ROM and is to be executed by a processor. Consequently, a computer-readable medium is intended to include a computer readable signal, which may be, for example, transmitted over a network. Accordingly, many modifications may be made by one of ordinary skill in the art without departing from the spirit and scope of the appended claims.

We claim:

1. A computer implemented method for providing a widget, the computer including a display, the method comprising:
   receiving a request corresponding to the widget, the widget being portable, embeddable and for dynamically displaying multimedia content;
   performing an authentication corresponding to the request;
   fulfilling the request if the authentication is successful, the step of fulfilling the request including rendering at least a portion of the widget on the display; and
   selectively pushing to the computer system at least one update to an ancestor widget of the widget if the authentication is successful and based on an ancestry of the widget, the widget being a copy of the ancestor widget, the step of pushing the at least one update including tracking the ancestry of the widget, the ancestry including at least one generation between the widget and the ancestor widget.

2. The method of claim 1 wherein the request is for the widget and wherein the authentication performing further includes:
   authenticating the widget and wherein the fulfilling further includes
   providing the widget if the widget is authenticated.

3. The method of claim 2 wherein the request is from a host application and wherein the authenticating the widget further includes:
   providing an encrypted code corresponding to the widget; and
   providing the widget to the host application if the encrypted code is decrypted.

4. The method of claim 3 wherein the widget providing further includes:
   referring the host application to an additional location;
   providing the widget code form the additional location.

5. The method of claim 4 wherein the widget code providing further includes:
   performing moderation for the widget.

6. The method of claim 5 wherein the host application is used for viewing a site and wherein the moderation performing further includes:
   determining whether the site is authorized for the widget.

7. The method of claim 3 wherein the wherein the authenticating the widget providing further includes:
   providing a widget code to the host application, the widget code being executable on the host application; and
   providing a widget feed to the widget if the widget can decrypt the encrypted code.

8. The method of claim 1 wherein the request is from the widget and wherein the fulfilling further includes:
   authenticating the widget and wherein the fulfilling further includes
   providing a response to the widget if the widget is authenticated.

9. The method of claim 1 wherein the request is for a server.

10. The method of claim 9 wherein authentication further determines whether the server is authorized for the widget.

11. The method of claim 1 further comprising:
    performing moderation for the widget.

12. A computer implemented method for providing a widget associated with a widget owner, the method comprising:
    receiving a request for a widget code for the widget from a host application of a computer system having a display, the widget being portable, embeddable and for dynamically displaying multimedia content;
    providing an encrypted code to the host application and referring the host application to an additional site;
    providing the widget code for the widget to the host application from the additional site;
    allowing the widget code to be played on the host application such that the widget is rendered on the display;
    receiving an additional request for a widget feed from the widget;
    providing the widget feed such that at least a portion of the widget is rendered on the display in response to the additional request if the widget can decrypt the encrypted code; and
    selectively pushing to the computer system at least one update to an ancestor widget of the widget if the widget can decrypt the encrypted code and if an ancestry of the widget meets at least one condition, the widget being a copy of the ancestor widget, the step of pushing the at least one update including tracking the ancestry of the widget, the ancestry including at least one generation between the widget and the ancestor widget.

13. A system for providing a widget comprising;
    at least one server for receiving a request corresponding to the widget, the widget being portable, embeddable and for dynamically displaying multimedia content;
    a database for storing data for the widget; and
    an authentication system for performing an authentication corresponding to the request;
    wherein the request is fulfilled if the authentication is successful and wherein the server selectively pushes to a computer system requesting the widget at least one update to an ancestor widget of the widget if the authentication is successful and based on an ancestry of the widget, the widget being a copy of the ancestor widget, the pushing the at least one update including tracking the ancestry of the widget, the ancestry including at least one generation between the widget and the ancestor widget.

14. The system of claim 13 wherein the at least one server and the database correspond to a provider and wherein authentication system corresponds to an owner separate from the provider.

15. The system of claim 13 wherein the at least one server and the database correspond to a provider and wherein at least a portion of the authentication system reside within the provider.

16. The system of claim 13 wherein the server provides an encrypted code corresponding to the widget; and
    wherein the widget is provided to the host application if the encrypted code is decrypted.

17. The system of claim 15 further comprising:
    an additional location for providing widget code corresponding to the widget.

18. The system of claim 13 wherein the request is from a host application, the widget code being executable on the host application, wherein at least a portion of the authentication system resides in the server, and wherein the at least the portion of the authentication subsystem further provides a widget code to the host application and provides a widget feed to the widget if the widget can decrypt the encrypted code.

19. The system of claim 13 wherein the request is from the widget, wherein the authentication system further authenticates the widget, and wherein the server provides a response to the widget if the widget is authenticated.

20. The system of claim 13 wherein the request is for a server and wherein the authentication system further determines whether the server is authorized for the widget.

21. An executable software product stored on a non-transitory computer-readable medium containing program instructions for providing a widget, the program instructions for:
receiving a request corresponding to the widget, the widget being portable, embeddable and for dynamically displaying multimedia content;
performing an authentication corresponding to the request;
fulfilling the request if the authentication is successful; and
selectively pushing to a computer system providing the request at least one update to an ancestor widget of the widget if the authentication is successful and based on an ancestry of the widget, the widget being a copy of the ancestor widget, the pushing the at least one update including tracking the ancestry of the widget, the ancestry including at least one generation between the widget and the ancestor widget.

22. The executable software product of claim 21 wherein the request is from a host application and for the widget and wherein the authenticating performing further includes:
providing an encrypted code corresponding to the widget; and
providing the widget to the host application if the encrypted code is decrypted.

23. The executable software product of claim 22 wherein the widget providing further includes:
providing a widget code to the host application, the widget code being executable on the host application; and
providing a widget feed to the widget if the widget can decrypt the encrypted code.

24. The executable software product of claim 21 wherein the request is from the widget and wherein the fulfilling further includes:
authenticating the widget and wherein the fulfilling further includes
providing a response to the widget if the widget is authenticated.

* * * * *